March 16, 1965 L. C. CHOUINGS 3,173,261
FLUID PRESSURE BRAKING SYSTEMS
Filed March 5, 1962 5 Sheets-Sheet 1
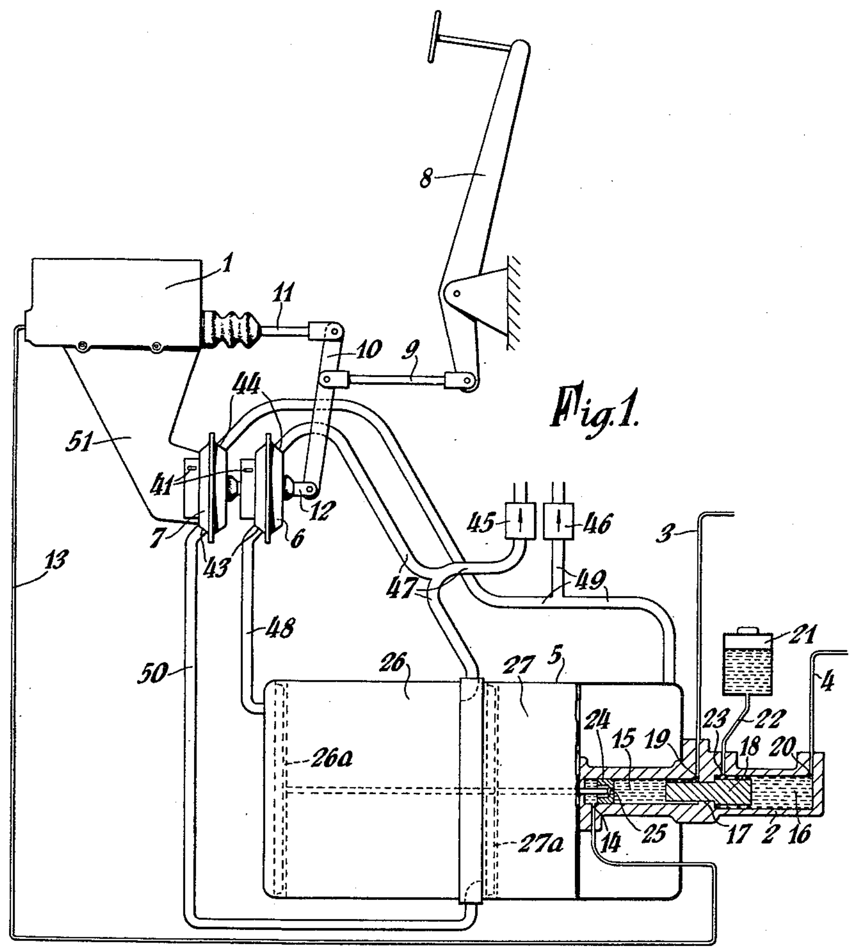
INVENTOR
Leslie C. Chouings
BY
Lawrence J. Winter
ATTORNEY March 16, 1965 L. C. CHOUINGS 3,173,261
FLUID PRESSURE BRAKING SYSTEMS
Filed March 5, 1962 5 Sheets-Sheet 2
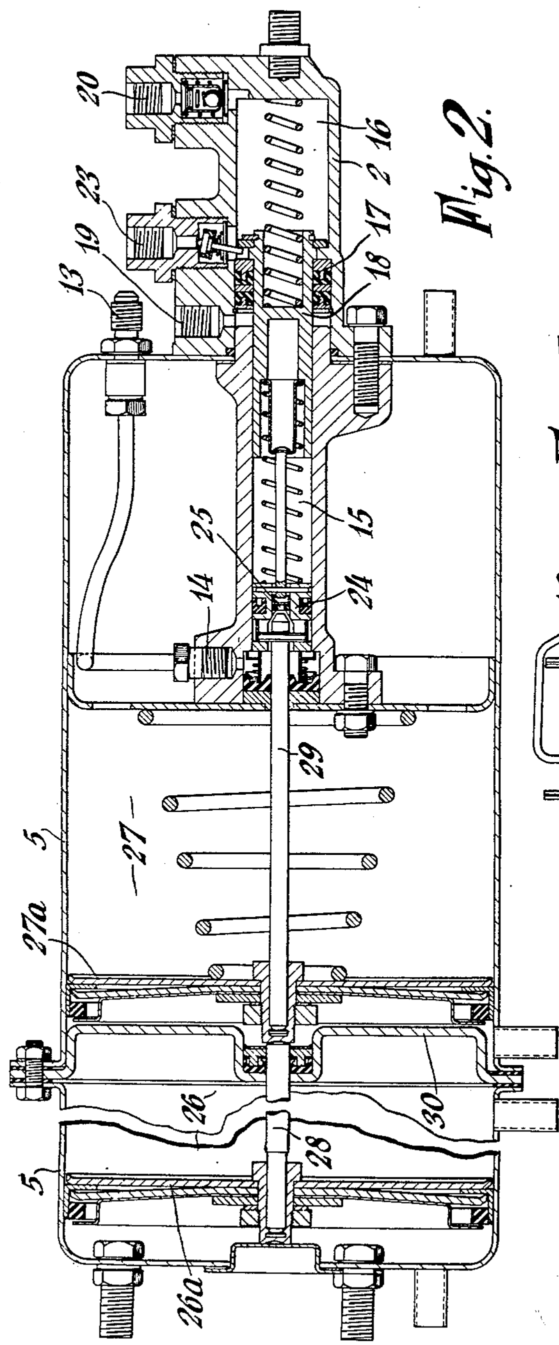
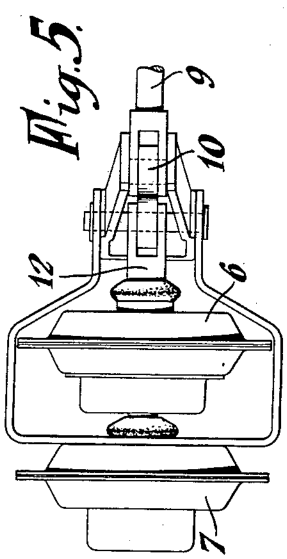
INVENTOR
Leslie C. Chouings
BY Lawrence J. Winter
ATTORNEY FLUID PRESSURE BRAKING SYSTEMS
Filed March 5, 1962 5 Sheets-Sheet 3
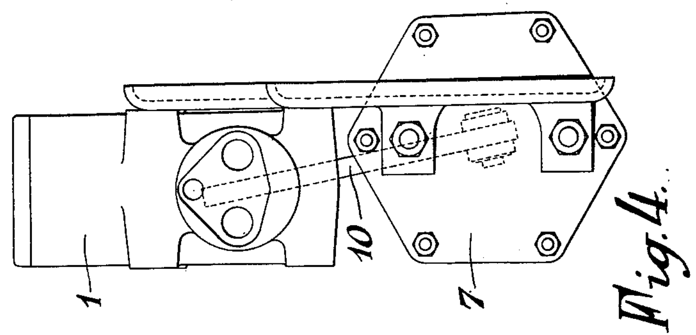
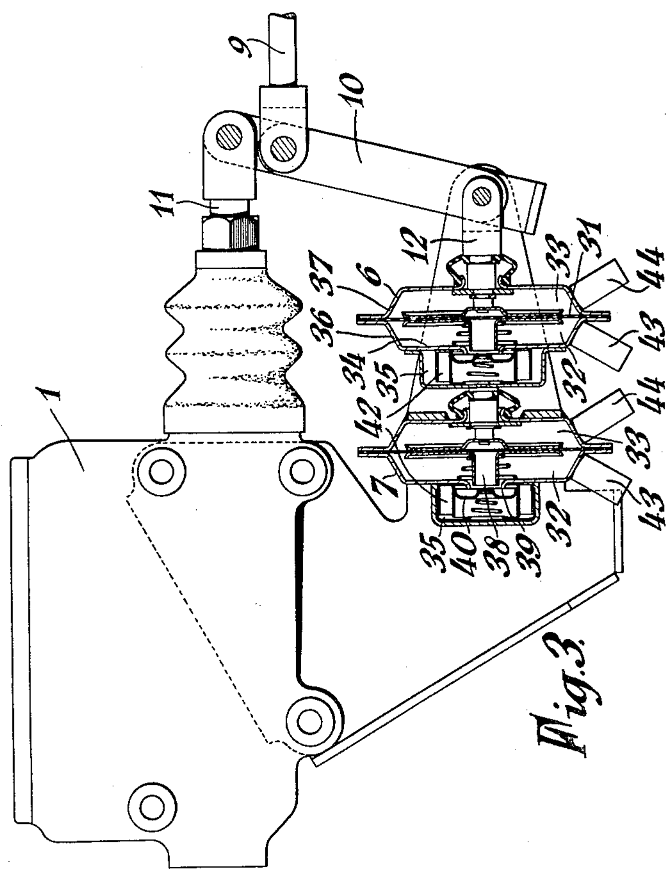
INVENTOR
Leslie C. Chouings
BY
Lawrence J. Winter
ATTORNEY FLUID PRESSURE BRAKING SYSTEMS
Filed March 5, 1962 5 Sheets-Sheet 4
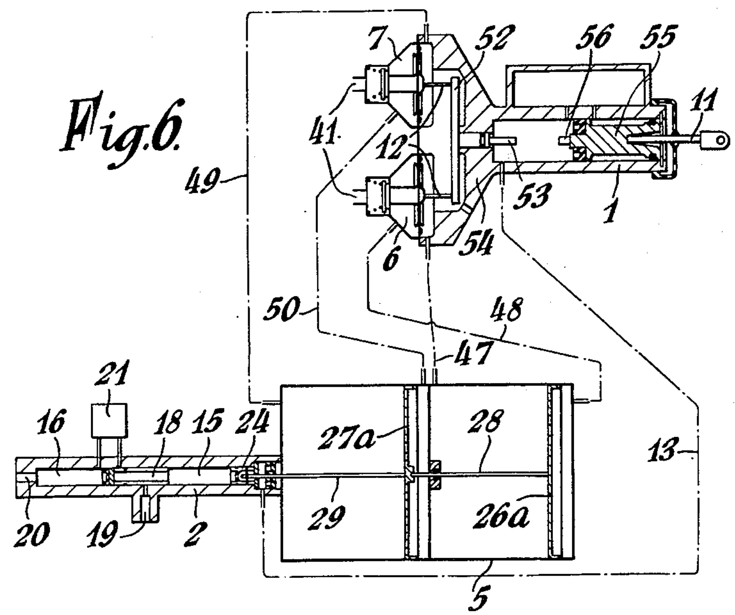
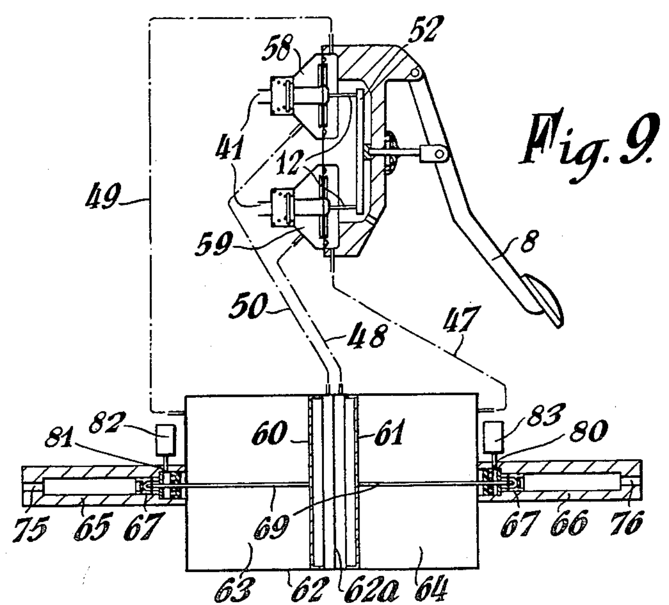
INVENTOR
BY Leslie C Chouings
Lawrence J Winter
ATTORNEY March 16, 1965 L. C. CHOUINGS 3,173,261
FLUID PRESSURE BRAKING SYSTEMS
Filed March 5, 1962 5 Sheets-Sheet 5
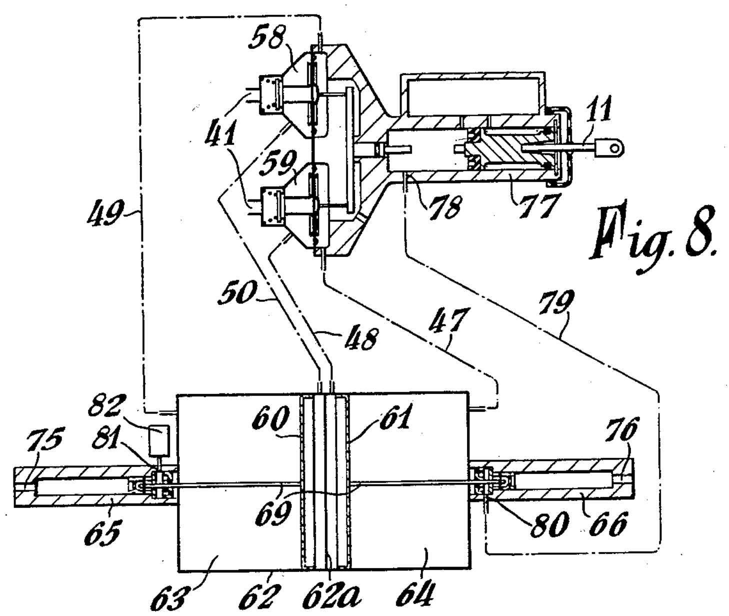
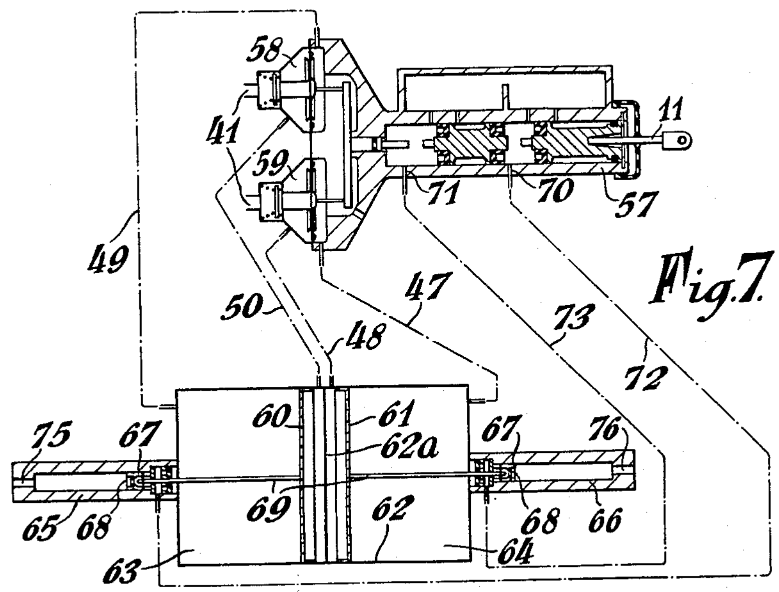
INVENTOR
Leslie C. Chouings
BY
Laurence J. Winters
ATTORNEY

United States Patent Office 3,173,261

Patented Mar. 16, 1965

3,173,261

FLUID PRESSURE BRAKING SYSTEMS

Leslie C. Chouings, Leamington Spa, England, assignor to Automotive Products Company Limited, Leamington Spa, England Filed Mar. 5, 1962, Ser. No. 177,416

Claims priority, application Great Britain, Mar. 8, 1961, 8,534/61

11 Claims. (Cl. 60—54.5)

This invention relates to servo-operated fluid pressure braking system for vehicles.

The invention has for its object to provide for the independent operation of the brakes of the front and rear wheel brakes of a vehicle so that the operation of the brakes of one set of road wheels is unimpaired in the event of failure of the fluid pressure supply to the brakes of the other set of road wheels.

In accordance with the invention it is proposed to provide separate fluid pressure circuits for the brakes of the front and rear wheels of the vehicle, master cylinder means for supplying the pressure fluid to the separate fluid pressure circuits and separate servo-devices operable independently of one another to effect operation of master cylinder means to supply pressure fluid to the brake circuits, the operation of each servo-device being controlled by a valve each said valve being operatively associated with a foot pedal or other operator control so as to be actuated to control operation of the servo devices, upon operation of said operator control.

Embodiments of the invention will now be described by way of example by aid of the accompanying drawings in which:

FIGURE 1 shows diagrammatically a system according to one embodiment of the present invention;

FIGURE 2 shows in longitudinal section a combined servo-device and master cylinder unit for the system disclosed in connection with FIGURE 1.

FIGURE 3 is a view partly in section of a pedal operated master cylinder combined with valves for controlling operation of the servo-device of FIGURE 1;

FIGURE 4 is a view from the left of FIGURE 3; and

FIGURE 5 is a plan view of the value mechanism shown in FIGURE 3;

FIGURES 6 to 9 show diagrammatically various systems according to further embodiments of the invention.

In the system shown diagrammatically in FIGURE 1, hydraulic liquid from a pedal operated master cylinder 1, is supplied to a second master cylinder 2 having separate outlets, one of which is connectable by a pipe line 3 to the wheel cylinders of the brakes on one axle of the vehicle the other outlet being connectable by a pipe line 4 to the wheel cylinders of the brakes on the other axle of the vehicle. The second master cylinder 2 is associated with a servo-unit 5 incorporating two servo-devices connected to separate sources of fluid pressure either positive or negative and independently operable by actuation of valves 6 and 7 associated with the foot pedal and arranged so as to be operated in sequence. The arrangement is such that hydraulic liquid supplied to the second master cylinder 2 from the pedal operated master cylinder 1 is delivered by the pipe line 3 to the wheel cylinders connected thereto to operate the brakes on the one axle. The hydraulic liquid also effects operation of the second master cylinder 2 to supply hydraulic fluid from a separate source of supply connected to the master cylinder to the pipe line 4 whereby the wheel cylinders connected thereto are actuated and the brakes of the other axle operated. Operation of the foot pedal also effects actuation of the valves 6 and 7 such actuation of the valves resulting in operation of the servo-devices to apply servo-assistance to the master cylinder 2.

Describing the system of FIGURE 1 in greater detail, with reference also to the particular apparatus shown in FIGURES 2 to 5. The foot pedal 8 (FIGURE 1) is connected by a connecting rod 9 to a lever 10. One end of the lever 10 is connected to the piston rod 11 of the master cylinder 1 the other end of the lever 10 being connected to the operating member 12 of the valve 6 herein referred to as the first valve, which is arranged in tandem with the valve 7 herein referred to as the second valve. The outlet from the pedal operated master cylinder 1 is connected by pipe line 13 to the inlet 14 adjacent one end of the smaller diameter portion 15 of the bore of the second master cylinder 2, the bore being of increased diameter for a further portion 16 of its length, an intermediate portion 17 of the bore forming a guide for a piston 18 which separates the two portions 15 and 16 hydraulically from one another. The pipe line 3 is connected to an outlet port 19 in the portion 15 of the bore the pipe line 4 being connected to an outlet port 20 in the portion 16 of the bore, hydraulic liquid being supplied to this portion of the bore from a tank 21 connected by pipe line 22 to the inlet port 23.

The portion 15 of the bore of the second master cylinder also houses a second piston 24 having a central aperture 25 permitting the flow hydraulic liquid from the pipe line 13 to pass the pipe line 3. The second master cylinder 2 is mounted at one end of the servo-unit 5 which consists of a casing the interior of which is divided by a partition wall 30 to provide two servo-cylinders 26 and 27 each containing a servo-piston **26*a*, 27*a* respectively. Each servo-piston has a piston rod 28, 29 respectively, the piston rod 28 passing through the partition wall 30 so that the free end thereof can engage the piston 27*a*, the free end of the piston rod 29 extending into the bore of the second master cylinder 2 to provide a closure member for the aperture 25 in the second piston 24**.

The valves 6 and 7 are identical and of known construction. Broadly each valve consists of a casing the interior of which is divided by a diaphragm 31 to form first and second chambers 32 and 33 respectively, a partition wall 34 providing a third chamber 35. Each diaphragm 31 is clamped between a plate 36 and a spider 37 the plate 36 having a tubular central portion 38. The outer end of the tubular portion 38 faces an aperture 39 in the partition wall 34 the aperture being normally closed by a spring loaded closure plate 40, the diaphragm being spring loaded so that the spring loading acts normally to maintain the outer end of the tubular member clear of the closure plate 40. The third chamber 35 of each valve is open to atmosphere through a port 41 a filter 42 being provided for filtering air entering the third chamber, and the first and second chambers each have a port 43, 44 respectively.

The valve 6 controls the operation of the servo-piston **26*a* and the valve 7 the operation of the servo-piston 27*a* each servo-cylinder being connected to separate sources of vacuum through non-return valves shown diagrammatically at 45 and 46 respectively. A branched pipe line 47 connects the non-return valve 45 to the servo-cylinder space on one side of the piston 26*a* and to the port 44 of the valve 6, the cylinder space on the other side of the piston 26*a* being connected by pipe line 48 to the port 43 of valve 6. Similarly, a branched pipe line 49 connects the non-return valve 46 to the cylinder space on one side of the piston 27*a* and to the port 44 of the valve 7, the cylinder space on the other side of the servo-piston 27*a* being connected by pipe line 50 to the port 43 of the valve 7**.

The valves 6 and 7 are supported by a bracket 51 secured to the body of the pedal operated master cylinder 1. The valves are arranged in tandem the valve operating member 12 of valve 6 being as previously referred to, connected to the lever 10, the inner end of the operating member being connected to the valve diaphragm spider. The valve 6 is mounted so as to be capable of movement towards and away from the valve 7, the outer end of the valve operating member 12 of the valve 7 being connected to the adjacent end of the casing of valve 6, the inner end of this valve operating member being connected to the valve diaphragm spider of the valve 7.

In operation, upon depression of the foot pedal 8, pressure is created in the hydraulic circuit, herein referred to as the primary circuit, consisting of pipe line 13, bore portion 15 of the second master cylinder pipe line 3 and the wheel cylinders connected thereto. The pressure in this primary circuit also acts on the piston 18 so that a corresponding pressure is created in the hydraulic circuit, herein referred to as the secondary circuit, and consisting of the bore portion 16, pipe line 4 and wheel cylinders connected thereto. This operation of the system corresponds to the system disclosed in the specification of our copending application No. 263,198. However in the present system the depression of the foot pedal results in movement of the lever 10 this movement causing the valve operating member of valve 12 to move to the left so that the tubular portion 38 of the valve plate 36 of valve 6 engages the closure plate 40 and unseats the same from the aperture 39 in partition wall 34. At the limit of movement of the valve closure plate 40 of the valve 6 the valve is axially displaced as a whole towards the valve 7 with the result that this valve is actuated in the same manner as valve 6. Actuation of the two valves as above described results in air being supplied through the pipe lines 43 and 50 to the appropriate sides of the servo-pistons **26*a* and 27*a* the resulting displacement of these pistons applying a servo-action to the master cylinder 2. The total output pressure from the servo-pistons is, therefore, the pressure generated by the servo-pistons plus pressure generated due to the pressure generated by operation of master cylinder 1 acting on the piston 18 in the second master cylinder 2**.

With the system above described failure of the following hydraulic lines or connections set out in the headings will result in the conditions referred to.

(i) *Failure of hydraulic input (pipe line 13) or output to wheel cylinders of pipe line 3.*—On application of pedal 8 the piston of master cylinder 1 travels onto its forward stop enabling valves 6 and 7 to be operated this directs atmospheric pressure to the rear of the servo power pistons **26*a* and 27*a*, hydraulic pressure is thus produced in the secondary circuit only actuating the wheel cylinders connected to pipe line 4**.

(ii) *Failure of secondary hydraulic circuit.*—On application of pedal 8 master cylinder 1 and valves 6 and 7 function as already described this raised pressure in primary circuit thus providing actuation of wheel cylinders connected to pipe line 3.

(iii) *Failure at one vacuum source.*—On failure at one vacuum source, non-return valve 45 or 46 depending on which system has failed, seats, thus preventing atmospheric pressure from entering the vacuum system. Assuming that the system was exhsausted to the specified degree of vacuum one application of brakes with full servo-assistance will be possible, further application of brakes with less assistance can be obtained until the reservoir capacity of servo connected to the source that failed has been used up. At that point assistance will remain at half its normal figure due to only one power piston operating at full pressure difference.

(iv) *Failure of both vacuum sources.*—Assuming systems to be exhausted to the specified degree of vacuum when failure occurs both non-return valves 45 and 46 will seat it will be possible to obtain one application of brakes with full servo-assistance further applications of brakes with less assistance can be obtained until reservoir capacity has been used up after which braking is effected without vacuum assistance.

(v) *Failure of valve 45 or 46.*—This would result in servo giving only half its normal assistance due to only one power piston operating.

(vi) *Failure of both valves 45 and 46.*—System will function without vacuum assistance. The system shown diagrammaitcally in FIGURE 6 of the accompanying drawings is substantially the same as that disclosed in connection with FIGURES 1 to 5, but differs mainly in the arrangement of the valves controlling operation of the servo-pistons. Accordingly the same reference numeral are used to denote corresponding parts of the two systems. In the system according to FIGURE 6 the valves 6 and 7 are arranged side by side the operating members 12 of the two valves being interconnected by a cross-bar 52. The cross-bar has a plunger 53 slidable in a drilling in a bracket 54 supporting the valves the bracket being attached to the housing of the pedal operated master cylinder 1. The plunger 53 is arranged co-axially with the piston 55 of the master cylinder 1 and the free end of the plunger extends into the bore of the master cylinder so as to be engageable by a tappet 56 on the piston 55. The system operates generally in the manner described above, the valves 6 and 7 being operated when the tappet 56 engages the plunger 53.

In the system shown diagrammatically in FIGURE 7 separate master cylinders are provided for supplying hydraulic fluid pressure to the wheel cylinders of the two axles, each master cylinder being associated with a separate servo-device. The apparatus for carrying out the system according to this embodiment of the invention comprises a pedal operated tandem master cylinder 57 operatively associated with two servo-control valves 58 and 59, the valve 58 controlling operation of a servo piston 60 and the valve 59 the operation of a servo piston 61. The two servo pistons are arranged back to back in a common casing 62 the interior of which is divided by partition wall **62*a* to provide two servo cylinders 63 and 64. Two master cylinders 65 and 66 are arranged one at each end of the casting 62, the bore of each master cylinder being co-axial with the servo-pistons 60 and 61. The master cylinders 65 and 66 each house a piston 67 each of which has a central aperture 68, the servo pistons each having a piston rod 69** the outer end of each of which extends into the bore of the appropriate master cylinder each such end forming a closure member for the piston aperture when brought into contact therewith.

The control valves 58 and 59 are of the type shown in FIGURE 3 and are arranged side by side as disclosed in the arrangement of FIGURE 6 so as to be operable by the appropriate piston of the tandem master cylinder 57. The tandem master cylinder 57 and the master cylinders 65, 66 are of generally known construction and accordingly do not require detailed description. The tandem master cylinder has two outlets 70 and 71, the outlet 70 being connected by pipe line 72 to the inlet of master cylinder 65, the outlet 71 being connected by pipe line 73 to the inlet 74 of master cylinder 66. The pipe lines between the valves 58 and 59 and the respective servo-cylinders are all as previously disclosed and accordingly for clarity the same reference numerals have been used on the drawings to denote corresponding parts.

The master cylinders 65, 66 each have an outlet at one end denoted respectively by the reference numerals 75, 76, the outlet 75 being connected to the wheel cylinders of the brakes of the wheels on one axle and the outlet 76 connected to the wheel cylinders of the brakes of the wheels on the other axle. Thus with the system disclosed in FIGURE 7 separate hydraulic circuits are provided for the wheel cylinders of the two axles whereby a braking action is available should one or the other circuits cease to function.

In the system shown diagrammatically in FIGURE 8 separate master cylinders each having an associated servo-device are used as disclosed in connection with the system of FIGURE 7, the servo-devices being actuated by valves also as disclosed in the description relating to this figure. Accordingly where possible the same reference numerals have been used to denote like parts. In the system of FIGURE 8 however a single barrel type pedal operated master cylinder 77 is provided the outlet 78 of which is connected by a pipe line 79 to the inlet 80 of the master cylinder 66. The inlet 81 of the master cylinder 65 is connected to a tank 82 containing hydraulic liquid so that the two hydraulic circuits supplying the wheel cylinders of the separate axles are separated. Accordingly upon operation of the foot pedal the pressure generated in the master cylinder 77 effects operation of the wheel cylinders connected to the outlet 76 of the master cylinder 66, the wheel cylinders of the other axle, which are connected to the outlet 75 of the master cylinder 65 being actuated by pressure liquid from this master cylinder when operated by the servo-piston 60.

In the system shown diagrammatically in FIGURE 9, the pedal operated master cylinder is dispensed with, the foot pedal 8 being operatively associated with the servo-control valves which are of the type already described. The valve are arranged side by side also as previously described and control the operation of servo-pistons arranged back to back in a common casing, having master cylinders at each end thereof. The arrangement of valves, master cylinders and servo-devices is identical with that disclosed in connection with FIGURE 8 and accordingly the same reference numerals are used on the drawing to denote like parts. In the present system however, as the pedal operated master cylinder has been dispensed with each master cylinder has its own tank for the supply of hydraulic liquid the master cylinder 66 having a tank 83 connected to the inlet 80 and the master cylinder 65 a tank 82 as in the system of FIGURE 8. In the system according to FIGURE 9 therefore, whilst separate hydraulic circuits are provided for supplying pressure liquid to the wheel cylinders of the separate axles these are operable only upon actuation of the servo-devices.

I claim:

1. A servo operated fluid pressure braking system for vehicles comprising separate fluid pressure brake circuits for the front and rear wheel brakes of a vehicle, master cylinder means for supplying fluid under pressure to said separate brake circuits, separate servo devices independently operable of each other and each operatively connected to said master cylinder means to supply fluid to said brake circuits, a separate valve operatively connected to each said servo device for controlling the respective operation thereof, and foot pedal means operatively connected to each said valve for actuating it to control operation of its respective servo device.

2. A braking system according to claim 1, comprising a first master cylinder operatively associated with the operator control to supply fluid pressure to a second master cylinder connectable to the brakes of the wheels on one axle, a further master cylinder connectable to the brakes of the wheels on the other axle separate servo-devices associated with said second and further master cylinders and separate valves for controlling operation of said servo-devices, operation of said operator control resulting in the actuation of said second master cylinder by pressure fluid from said first master cylinder to operate the brakes of the wheels of the axle connected thereto and operation of the valves to permit operation of both servo-devices to assist operation of said second master cylinder and operate said further master cylinder.

3. A braking system according to claim 1, comprising a master cylinder for operating the brakes of the wheels of one axle and a further master cylinder for operating the brakes of the wheels of the other axle, separate servo-devices associated with each said master cylinder and separate valves for controlling operation of the servo-devices, said valves being operatively associated with the operator control so as to be actuated thereby to permit operation of the servo-devices to operate the master cylinders and actuate the brakes.

4. A braking system according to claim 3 wherein the servo-control valves are arranged in tandem.

5. A braking system according to claim 4, wherein the servo-control valves are arranged side by side.

6. The braking system of claim 1 wherein said master cylinder means comprises a first and second master cylinder, said first cylinder being operable by said foot pedal means to supply fluid to said second cylinder, said second cylinder being in communication with said separate fluid pressure brake circuits, and said separate servo devices being operatively connected to said second cylinder.

7. The braking system of claim 6 wherein a piston is disposed in said second cylinder, and one of said second cylinder fluid pressure circuits receives fluid directly from said first cylinder and said fluid actuates said piston to provides pressure fluid from an independent source to the other fluid circuit.

8. A braking system according to claim 7, wherein hydraulic fluid for said other hydraulic circuit is obtained from a tank connected to the second cylinder to supply hydraulic fluid to the side of the second cylinder piston opposite the side acted on by the pressure fluid from the first cylinder.

9. The braking system of claim 6 wherein said second cylinder is a tandem cylinder with outlets connected to the inlets of said separate fluid pressure brake circuits.

10. The braking system of claim 9 wherein said foot pedal means are mechanically connected to each of said valves.

11. The braking system of claim 10 wherein said valves are disposed in tandem relationship.

References Cited by the Examiner

UNITED STATES PATENTS

| | | | |
|---|---|---|---|
| 2,402,344 | 6/46 | Price | 60—54.5 X |
| 2,945,725 | 7/60 | Hill | 303—24 |
| 2,957,454 | 10/60 | Stelzer | 60—54.6 X |
| 3,083,694 | 4/63 | Schanz | 91—414 |

FOREIGN PATENTS

| | | |
|---|---|---|
| 837,576 | 6/60 | Great Britain. |

JULIUS E. WEST, *Primary Examiner*.

ROBERT R. BUNEVICH, *Examiner*.